J. G. PERRIN.
STEERING POST SWITCH.
APPLICATION FILED JAN. 3, 1911.

1,030,124.

Patented June 18, 1912.

Witnesses:
Geo. Schwarz.
Sully Russo.

Inventor
John G. Perrin
By his Attorneys
Redding Greeley Austin

UNITED STATES PATENT OFFICE.

JOHN G. PERRIN, OF PLATTSBURG, NEW YORK.

STEERING-POST SWITCH.

1,030,124.   Specification of Letters Patent.   Patented June 18, 1912.

Application filed January 3, 1911. Serial No. 600,379.

*To all whom it may concern:*

Be it known that I, JOHN G. PERRIN, a citizen of the United States, residing at Plattsburg, in the county of Clinton and State of New York, have invented certain new and useful Improvements in Steering-Post Switches, of which the following is a specification.

This invention relates to switches to control the various electrical circuits employed upon automobiles and similar vehicles, and one of the principal objects of the invention is to provide a combination switch which can be placed upon the steering post of an automobile or similar vehicle, and which shall be of such construction and design that all of the independent circuits employed upon the vehicle can be controlled therefrom.

The various other objects of the invention will be more fully set forth in the following description of one form of mechanism embodying my invention, which consists in the new and novel features of construction and combinations of parts hereinafter set forth and claimed.

Figure 1:
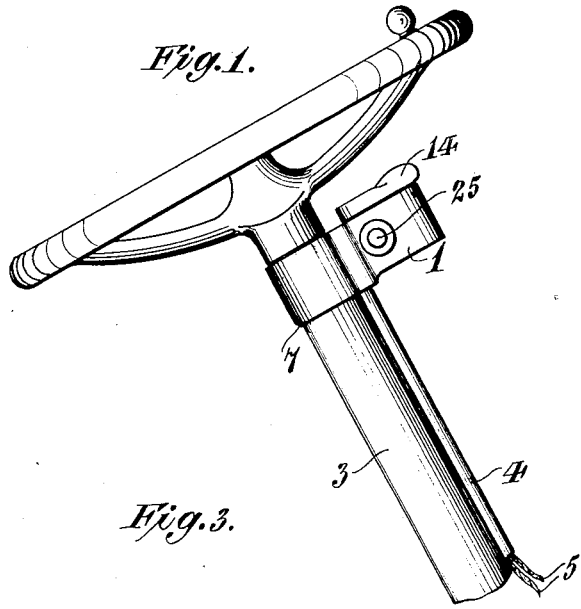
Figure 3:
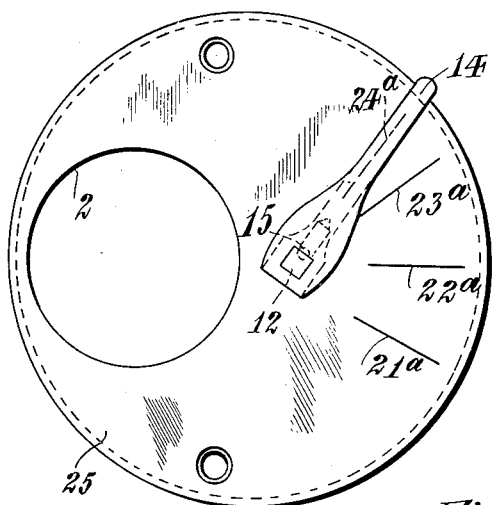
Figure 2:
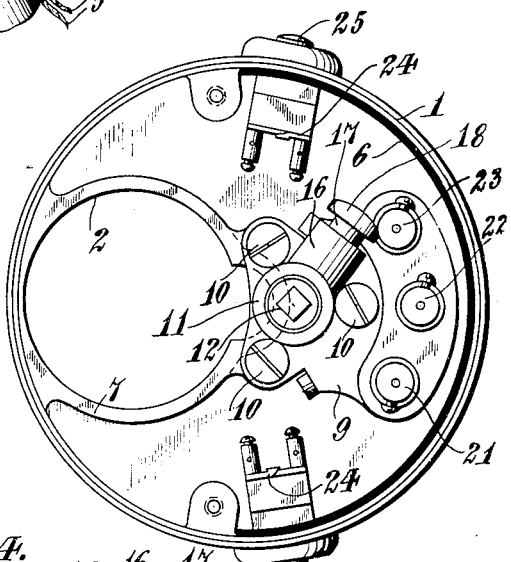
Figure 4:
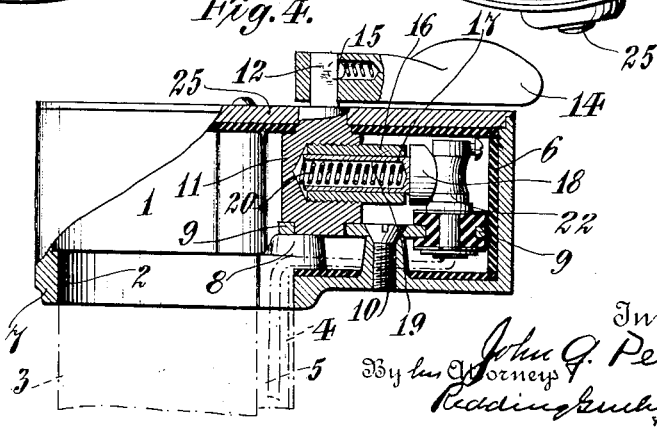

In the accompanying drawings:—Figure 1 is a side elevation of a portion of a steering wheel provided with my improved switch. Fig. 2 is a plan view of the switch with the cover removed. Fig. 3 is a detail plan view of the cover. Fig. 4 is a side elevation partly in section of the switch.

The switch casing 1 is provided with a suitable opening 2 to receive the steering post 3 of the vehicle. A segmental tube 4 is secured to or formed integral with the casing, and seats snugly against the steering post to contain the conducting wires 5. The interior of the casing is preferably lined with insulating material 6 which is secured to the walls of the casing in any suitable or well-known manner. The bottom plate of the casing is provided with a flange 7 which surrounds the steering post and also with an independent block 8, preferably formed integral therewith, which form a support for a bearing plate 9 which is secured to said flange and block in any suitable manner as by the screws 10.

Arranged approximately centrally of the casing is a rotatable post 11 having a squared extension 12 projecting above the casing, which is engaged and operated by a suitable handle 14. The handle is secured to the extension in any suitable manner as by a spring pressed bolt or plunger 15 which is held at the handle and partly projects into a recess provided in the extension. Said rotatable post is tapped to receive a sleeve or bushing 16. A plunger 17 comprising the head 18 and the hollow stem 19 is movably mounted in said sleeve and is normally forced outward by means of a suitable spring 20.

A plurality of binding posts 21, 22 and 23 are supported from the plate 9 and insulated therefrom and also from each other by suitable insulating material and are arranged so as to be successively engaged by the head 18 as the same is rotated. On either side of the post 11 and secured to the outer wall of the casing are switches 24 operated by push buttons 25 in any well known manner. Each of said switches is insulated from the casing and from the other switches by the insulation 6.

The independent switches may be arranged in circuit with the dash light and with the horn or in other circuits which are used only intermittently. The post 21 is not to be connected with any circuit and consequently when the plunger engages solely therewith the device is not in use. The binding post 22 may be connected with the battery and the binding post 23 may be connected with the magneto. Consequently when the handle is in the position 21ª indicated on the cover 25 the plunger will contact solely with the binding post 21 and all of the circuits will be opened. When the handle is in the position 22ª, however, then the plunger will contact with the binding post 22 and the battery circuit will be closed. In the position 23ª both the battery and the magneto circuits will be closed and in the position 24ª the magneto circuit only will be closed.

Heretofore switches have been made comprising binding posts so arranged that the various circuits, as for instance circuits comprising the battery and the magneto or both the battery and the magneto may be closed. By my construction, however, an extremely compact and simple arrangement of parts is secured, which permits easy and effective insulation and which also permits a much larger number of circuits to be controlled from a single point than has hitherto been possible. Furthermore the tube which contains the conducting wires is arranged to fit snugly against the steering post so that it is not only protected from injury, but is held securely against displacement.

It is obvious that various modifications within the skill of the mechanic may be made in the details of the construction herein set forth without departing from the spirit of the invention, provided the means set forth in the following claims be employed.

I claim as my invention:—

1. A steering post switch comprising a casing, means for securing the casing to a support, a bearing plate in said casing, a binding post supported by said plate and insulated therefrom, a shaft movably mounted in the bearing plate, a horizontal sleeve carried by said shaft, and a plunger movably mounted in said sleeve adapted to engage said binding post.

2. A steering post switch comprising a casing, means for supporting the casing, a bearing plate mounted in said casing and detachably secured thereto, a plurality of binding posts supported by said plate and insulated therefrom, a shaft movably mounted in said plate provided with a yielding plunger adapted to engage with said binding posts.

This specification signed and witnessed this 28th day of Dec., A. D., 1910.

JOHN G. PERRIN.

Signed in the presence of—
HENRY A. LOZIER,
E. S. CLEARY.